(12) United States Patent
Dannoux et al.

(10) Patent No.: US 11,375,784 B2
(45) Date of Patent: Jul. 5, 2022

(54) APPARATUS AND METHOD FOR PROTECTION OF GLASS DISPLAY OF AN ELECTRONIC DEVICE

(71) Applicant: Corning Incorporated, Corning, NY (US)

(72) Inventors: Thierry Luc Alain Dannoux, Avon (FR); Vladislav Yuryevich Golyatin, Avon (FR); Petr Gorelchenko, Painted Post, NY (US); Bin Zhang, Penfield, NY (US)

(73) Assignee: Corning Incorporated, Corning, NY (US)

( * ) Notice: Subject to any disclaimer, the term of this patent is extended or adjusted under 35 U.S.C. 154(b) by 1137 days.

(21) Appl. No.: 15/755,650

(22) PCT Filed: Aug. 29, 2016

(86) PCT No.: PCT/US2016/049211
§ 371 (c)(1),
(2) Date: Feb. 27, 2018

(87) PCT Pub. No.: WO2017/040379
PCT Pub. Date: Mar. 9, 2017

(65) Prior Publication Data
US 2020/0229559 A1 Jul. 23, 2020

Related U.S. Application Data

(60) Provisional application No. 62/212,121, filed on Aug. 31, 2015.

(51) Int. Cl.
*A45C 11/00* (2006.01)
*B32B 1/08* (2006.01)
(Continued)

(52) U.S. Cl.
CPC ............... *A45C 11/00* (2013.01); *B32B 1/08* (2013.01); *B32B 17/10018* (2013.01);
(Continued)

(58) Field of Classification Search
CPC .......... A45C 11/00; B32B 1/08; B32B 17/10; G06F 1/16
(Continued)

(56) References Cited

U.S. PATENT DOCUMENTS

| 8,532,480 B2 | 9/2013 | Hietala et al. |
| 8,665,236 B2 | 3/2014 | Myers |

(Continued)

FOREIGN PATENT DOCUMENTS

| CN | 102781188 A | 11/2012 |
| CN | 202743642 U | 2/2013 |

(Continued)

OTHER PUBLICATIONS

Chinese Patent Application No. 201680059907.2; English Translation of the First Office Action and Search Report dated Sep. 29, 2019; China Patent Office; 14 pgs.
(Continued)

*Primary Examiner* — Tahseen Khan
(74) *Attorney, Agent, or Firm* — Daniel J. Greenhalgh

(57) ABSTRACT

A glass sleeve assembly for a portable electronic device may comprise a glass sleeve extending longitudinally from a first opening defined by a first rim to a second opening defined by a second rim. The glass sleeve may have an internal surface. A first end cap may be positioned adjacent to the first opening and may have at least a portion extending longitudinally beyond the first rim. A second end cap may be positioned adjacent to the second opening and may have at least a portion extending longitudinally beyond the second rim. A frame may comprise first and second ends and a
(Continued)

central portion between the first and second ends. The central portion may be located within the glass sleeve. The ends of the frame may be connected to the end caps. Shock absorbing interlayers may be mounted to the end caps and the glass sleeve.

20 Claims, 8 Drawing Sheets

(51) Int. Cl.
B32B 17/10 (2006.01)
G06F 1/16 (2006.01)

(52) U.S. Cl.
CPC ...... *B32B 17/10935* (2013.01); *G06F 1/1656* (2013.01); *A45C 2011/002* (2013.01); *A45C 2011/003* (2013.01); *B32B 2307/56* (2013.01); *B32B 2315/08* (2013.01); *B32B 2457/00* (2013.01); *B32B 2571/00* (2013.01)

(58) Field of Classification Search
USPC .......................................................... 221/191
See application file for complete search history.

(56) References Cited

U.S. PATENT DOCUMENTS

| | | |
|---|---|---|
| 9,235,240 B2 | 1/2016 | Pakula et al. |
| 9,889,635 B2 | 2/2018 | Bellman et al. |
| 2010/0061039 A1 | 3/2010 | Sanford et al. |
| 2011/0187245 A1 | 8/2011 | Pakula et al. |
| 2011/0279961 A1 | 11/2011 | Shedletsky et al. |
| 2012/0069517 A1* | 3/2012 | Prest .................. G02F 1/13439 361/679.56 |
| 2013/0069502 A1 | 3/2013 | Hu et al. |
| 2013/0076612 A1 | 3/2013 | Myers |
| 2014/0098472 A1* | 4/2014 | Zhang ..................... H05K 5/02 361/679.01 |
| 2014/0240926 A1 | 8/2014 | Choi |
| 2015/0003022 A1 | 1/2015 | Chang |
| 2015/0116268 A1 | 4/2015 | Shedletsky et al. |
| 2015/0198838 A1 | 7/2015 | Bornstein et al. |
| 2016/0286671 A1 | 9/2016 | Ahmed et al. |
| 2017/0226004 A1 | 8/2017 | Gorelchenko et al. |

FOREIGN PATENT DOCUMENTS

| | | |
|---|---|---|
| CN | 202784250 U | 3/2013 |
| DE | 112010005568 T5 | 4/2013 |
| JP | 2014-534456 A | 12/2014 |
| KR | 10-2013-0087558 A | 8/2013 |
| KR | 10-2015-0014075 A | 2/2015 |
| TW | M486793 U | 9/2014 |
| WO | 2014/059411 A1 | 4/2014 |
| WO | 2016100639 A1 | 6/2016 |

OTHER PUBLICATIONS

Japanese Patent Application No. 2018-510997 Office Action dated Mar. 31, 2021, 5 pages (2 pages of English Translation and 3 pages of Original Document); Japanese Patent Office.

International Search Report and Written Opinion of the International Searching Authority; PCT/US2016/049211; dated Nov. 29, 2016; 10 Pages; European Patent Office.

Taiwanese Patent Application No. 105127815, Office Action dated Apr. 12, 2021, 4 page (English Translation Only); Taiwanese Patent Office.

Chinese Patent Application No. 201680059907.2, Notice of Allowance dated Jul. 14, 2021, 4 pages (English Translation Only), Chinese Patent Office.

\* cited by examiner

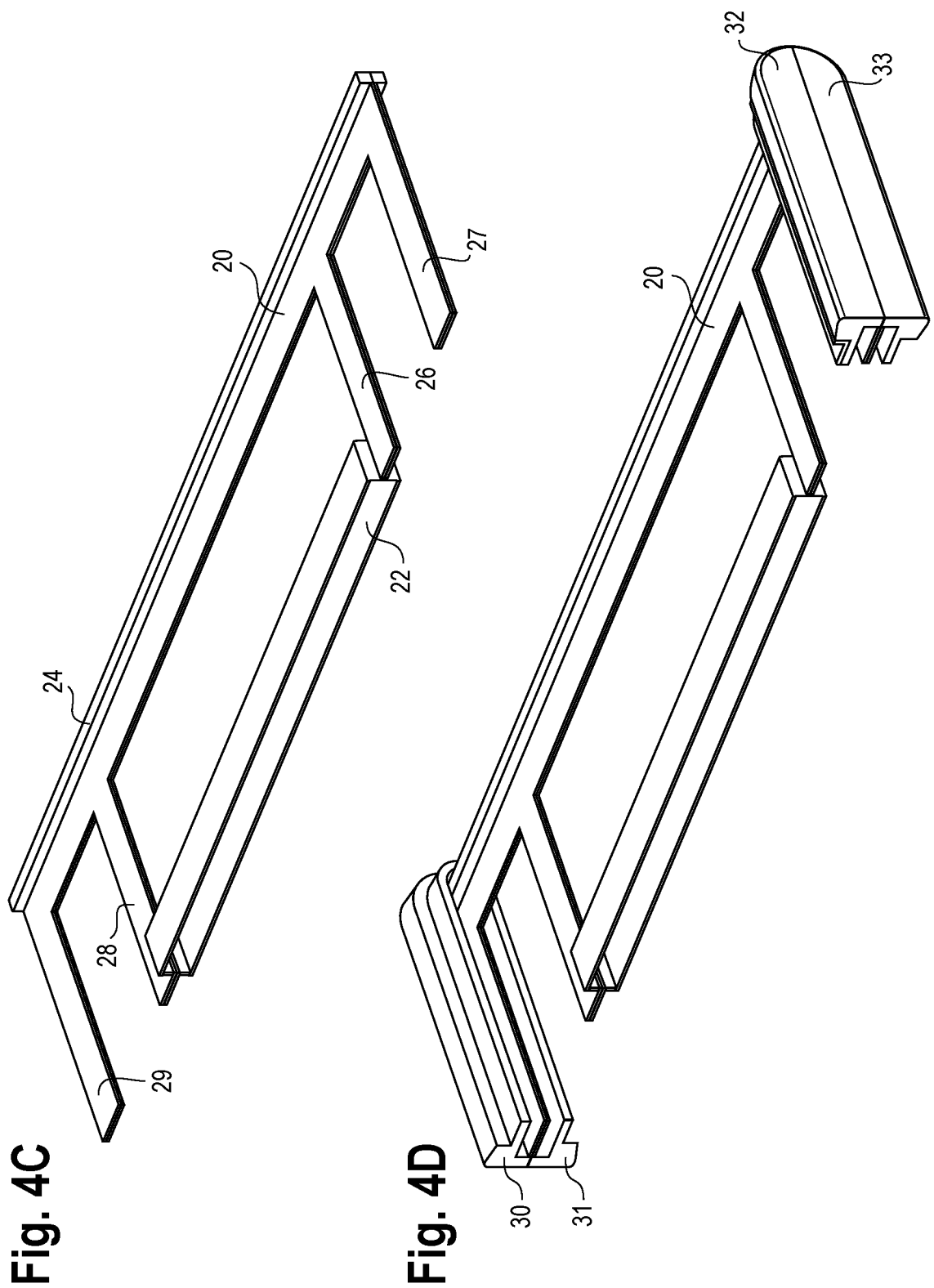

APPARATUS AND METHOD FOR PROTECTION OF GLASS DISPLAY OF AN ELECTRONIC DEVICE

CROSS-REFERENCE TO RELATED APPLICATIONS

This application claims the benefit of priority under 35 U.S.C. § 365 of International Patent Application Serial No. PCT/US16/49211 filed on Aug. 29, 2016, which in turn claims the benefit of priority to U.S. Provisional Application Ser. No. 62/212,121 filed on Aug. 31, 2015, the content of each are relied upon and incorporated herein by reference in their entirety.

FIELD

The present disclosure generally relates to protection of three-dimensional (3D) glass articles.

BACKGROUND

Many handheld electronic devices contain cover glass. Glass makers and handheld electronic device manufacturers have been making continuous efforts to improve the resistance to sharp contact failure of cover glass. To date, the majority of these efforts have focused on flat cover glass. The present disclosure describes methods and apparatuses to minimize sharp contact failure of 3D cover glass.

SUMMARY

Optionally, a glass sleeve assembly for a portable electronic device may comprise a glass sleeve, first and second end caps, a frame, and a shock absorbing interlayer. The glass sleeve may extend longitudinally from a first opening defined by a first rim to a second opening defined by a second rim. The glass sleeve may have an internal surface. The first end cap may be positioned adjacent to the first opening and may have at least a portion extending longitudinally beyond the first rim. The second end cap may be positioned adjacent to the second opening and may have at least a portion extending longitudinally beyond the second rim. The frame may comprise first and second ends and a central portion between the first and second ends. The central portion may be located within the glass sleeve, with the first end connected to the first end cap and the second end connected to the second end cap. The shock absorbing interlayer may be mounted to the first end cap and the glass sleeve.

Optionally, the frame may comprise first and second ends, a central portion between the first and second ends, one or more longitudinal bars, one or more lateral ribs, and a latch. The central portion may be located within the glass sleeve, with the first end connected to the first end cap and the second end connected to the second end cap. The latch may be configured to allow a battery to be mounted to the latch.

Optionally, a method for protecting a glass sleeve for a portable electronic device from failure may comprise several steps. A glass sleeve may be provided, where the glass sleeve extends longitudinally from a first opening defined by a first rim to a second opening defined by a second rim. The glass sleeve may have an internal surface and an external surface. A frame may be provided, where the frame comprises first and second ends and a central portion between the first and second ends. The frame may be inserted into the glass sleeve. A first end cap may be positioned adjacent to the first opening such that at least a portion may extend longitudinally beyond the first rim. The first end cap may have a first protruding side that may extend away from the first opening. The first protruding side may extend laterally beyond an external surface of the glass sleeve. A shock absorbing interlayer may be mounted to the first end cap and the glass sleeve. The first end cap may be connected to the first end of the frame. A second end cap may be positioned adjacent to the second opening such that at least a portion may extend longitudinally beyond the second rim. The second end cap may be connected to the second end of the frame.

Additional features and advantages of the present disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

FIG. 4C shows a perspective view of a frame. For clarity, half of the frame is shown.

FIG. 4D shows a perspective view of a frame with end caps. For clarity, half of the frame and half of the end caps are shown.

Figure 1:
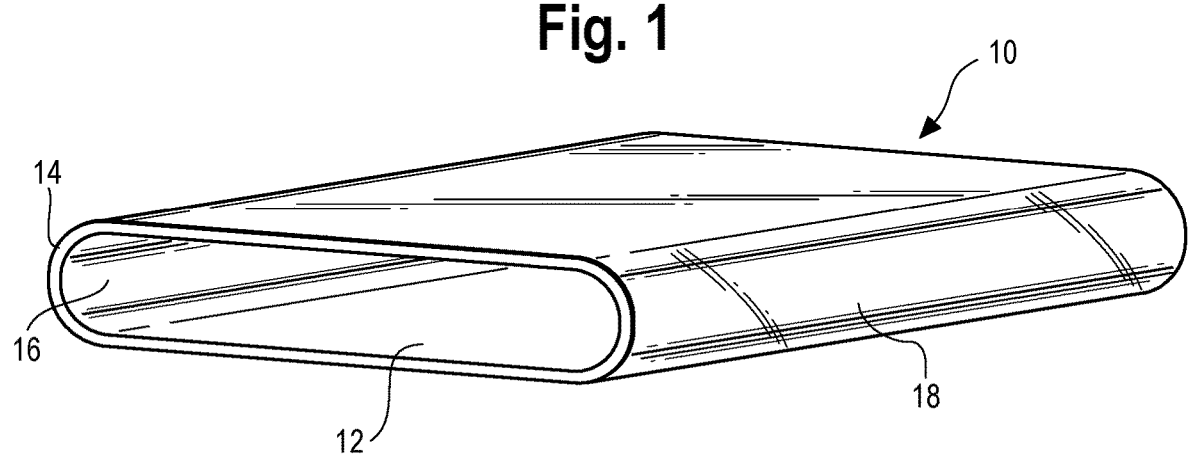
FIG. 1 shows a perspective view showing an example of a glass sleeve.

The following reference characters are used in this specification:

1 Glass sleeve assembly
10 Glass sleeve
12 Opening
13 Opening
14 Rim
15 Rim
16 Internal surface
18 External surface
20 Frame
22 Latch
24 Bar
26 Rib
27 Rib
28 Rib
29 Rib
30 End cap
31 End cap
32 End cap
33 End cap
40 Device interlayer
42 Interlayer
50 Device or component
52 Device or component
60 Resilient ring
70 Battery The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, numerous specific details are set forth in order to provide a thorough understanding of the present invention. However, it will be clear to one skilled in the art when the present invention can be practiced without some or all of these specific details. In other instances, well-known features or processes may not be described in detail so as not to unnecessarily obscure the invention. In addition, like or identical reference numerals may be used to identify common or similar elements.

The present disclosure relates to apparatuses comprising an improved glass sleeve body and methods for protecting a glass sleeve assembly for a portable electronic device. Optionally, the portable electronic device may be a mobile telephone (cell phone), a tablet, a portable computer, a remote control, a game console, a wrist watch, a wearable electronic device, or a different portable electronic device not listed here.

Figure 2:
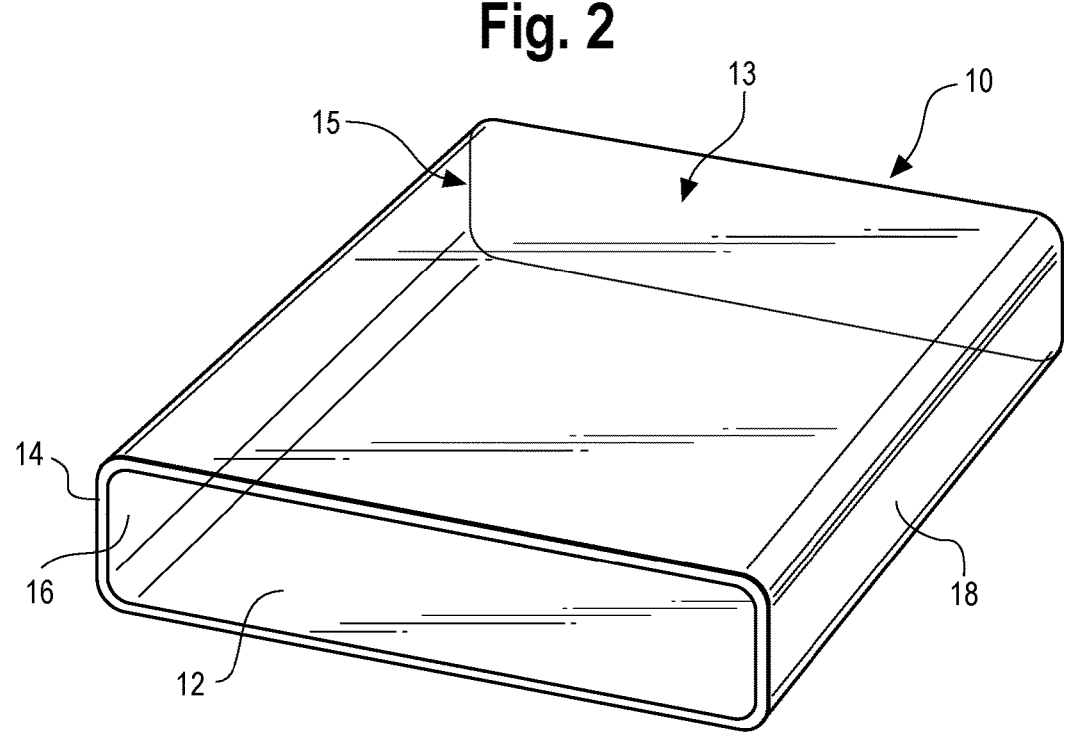
FIG. 2 shows a perspective view showing another example of a glass sleeve.

FIGS. 1 and 2 each illustrate an example glass sleeve 10 of the present disclosure. The glass sleeve 10 may comprise a first opening 12 that may be defined by a first rim 14. The glass sleeve 10 may extend to a second opening 13 that may be defined by a second rim 15. The second opening 13 may be opposite the first opening 12. Similarly, the second rim 15 may be opposite the first rim 14. The glass sleeve 10 may comprise an internal surface 16 and an external surface 18. In some embodiments, the glass sleeve may comprise one or more additional openings on the face (the widest roughly planar surface) or the edge (the narrower, rounded or flat edge surface). These openings may be useful for allowing access to electronic components that connect to or interact with the electronic device within the sleeve, such as buttons or connector ports.

Figure 3:
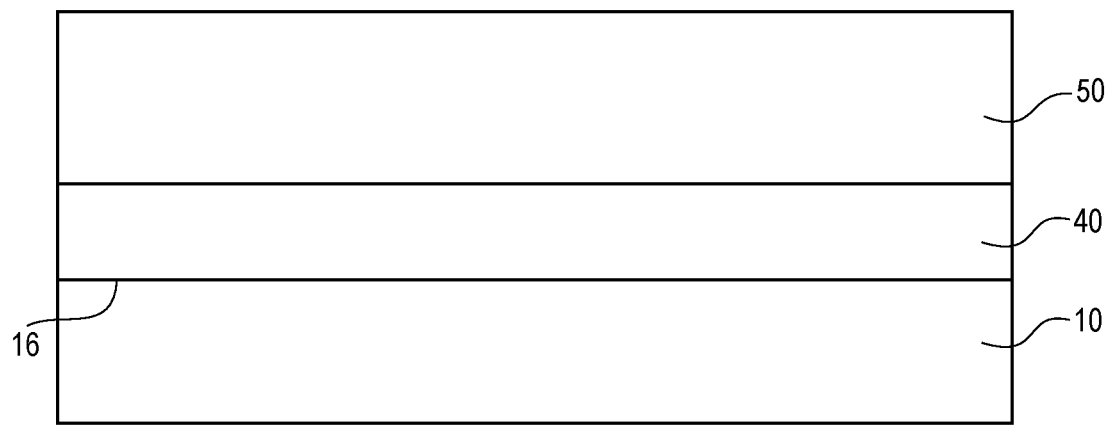
FIG. 3 shows a diagrammatic view showing a device or component separated from a glass sleeve by an interlayer.

As shown schematically in FIG. 3, a device or component 50 may be mounted to the internal surface 16 of the glass sleeve 10. The device or component 50 may be separated from the glass sleeve 10 by an device interlayer 40. The device interlayer 40 may provide shock absorption, for example to protect the glass sleeve 10 or the device or component 50 from damage or failure. As such, the device interlayer 40 may be a shock absorbing interlayer. The device interlayer 40 may be made from any suitable material, including an adhesive material, a foam material, or another soft material. The device interlayer 40 may be made of different materials depending on the location and structural needs of the device 50. Optionally, the device interlayer 40 may be made from an adhesive material such as epoxy, silicone, acrylic, polyurethane, polyimide, cyanate ester, or another suitable adhesive. Optionally, the device interlayer 40 may be a foam such as a polymethacrylimide-based foam, polyamide-based foam, a polyimide-based foam, a polyurethane-based foam, or another suitable polymer-based foam.

In some embodiments, component or device 50 comprises part or all of an electronic device. In some embodiments, component or device 50 comprises one or more of a driver component, a display component, a memory component, a fan or cooling component, or a controller component and the like. In some embodiments, glass sleeve assembly 1 comprises more than one component or device 50. In some embodiments, device or component 50 comprises a display screen. In some embodiments, component or device 50 occupies part of the space in the sleeve. In some embodiments, component or device 50 occupies greater than 20, 30, 40, 50, 60, 70, or 80% of the space in the sleeve. In some embodiments, component or device 50 is partially or completely supported on frame 20.

In such embodiments, device interlayer 40 can be located between a display screen of component 50 and the glass sleeve 10. The device interlayer between the display screen of component 50 and the glass sleeve 10 may be optically clear. An optically clear interlayer 40 may improve the optical performance of light travelling to and from the device or component 50 to the glass sleeve 10. Optionally, the device interlayer 40 may be an optically clear adhesive (OCA), such as an acrylic-based OCA, or silicone-based OCA, particularly when the device or component 50 is a display module. The device interlayer 40 may have a thickness of 50 μm to 1 mm, or preferably 100 μm to 750 μm, or preferably 200 μm to 600 μm, or preferably 500 μm. The device interlayer 40 may have a Young's modulus of 0.1 to 100 MPa, or preferably 1 MPa to 75 MPa, or preferably 20 MPa to 60 MPa, or preferably 50 MPa. Alternatively, the device interlayer 40 may be an air gap.

Figure 4A:
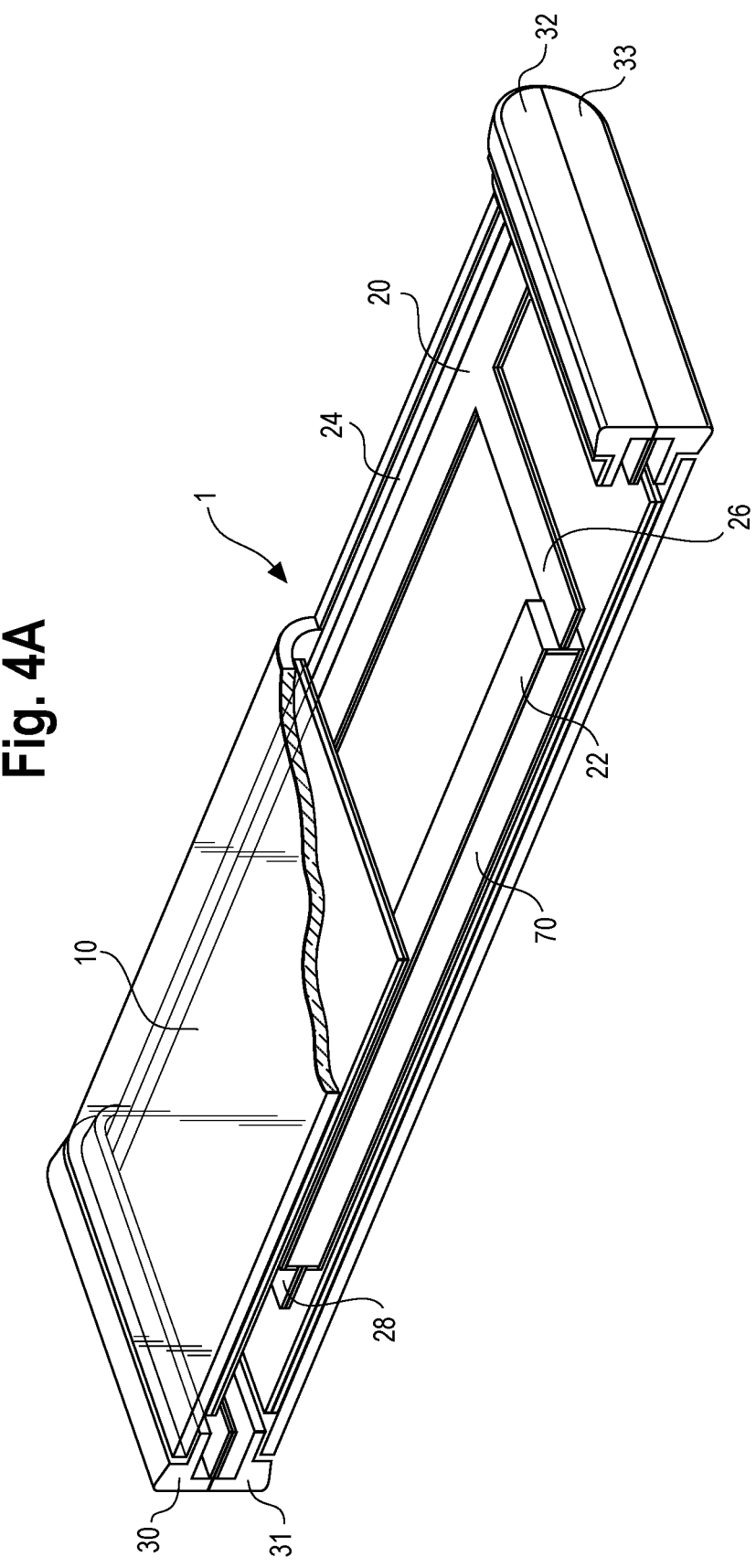
FIG. 4A shows a perspective cut away view of a frame with end caps mounted within a glass sleeve. For clarity, half of the frame, half of the end caps, and one quarter of the glass sleeve (additionally cut away) are shown.
Figure 4B:
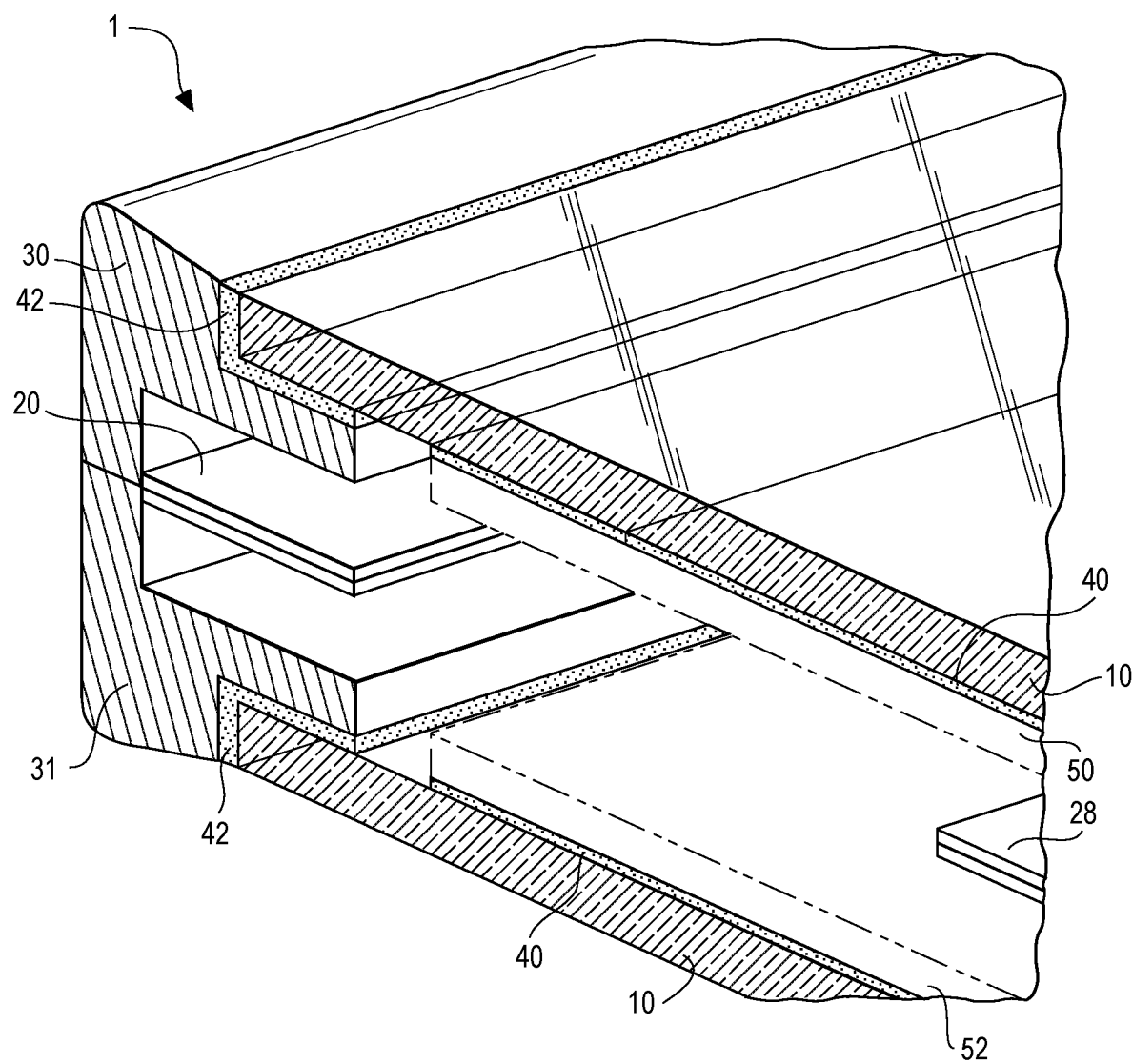
FIG. 4B shows a detail view, partially in section, of FIG. 4A.

One aspect comprises a frame 20. In some embodiments, frame 20 helps to protect the glass sleeve 10 from failure by holding device 50 within glass sleeve 10. Frame 20 may be mounted within the glass sleeve 10. In some embodiments, frame 20 works in combination with or in conjunction with end caps 30, 31, 32, 33. In other embodiments, frame 20 and end caps 30, 31, 32, 33 are independent of each other or interact in a limited way, such as to fix location of the frame. FIGS. 4A-4B show perspective cross-sectional views of the glass sleeve assembly 1. FIG. 4C shows the glass sleeve assembly 1 of FIG. 4A, but without the glass sleeve 10, battery 70, or end caps 30, 31, 32, 33. FIG. 4D shows the glass sleeve assembly 1 of FIG. 4A, but without the glass sleeve 10 or battery 70. For clarity, only half of the glass sleeve assembly 1 is shown in each of these figures; the remaining half of the glass sleeve assembly 1 (not shown) may be a mirror image of the half of the glass sleeve assembly 1 that is shown.

While frame 20 is shown centered, in some embodiments frame 20 is not centered and may be located closer to one face of sleeve 10 than the other or may comprise multiple frames that are located within sleeve 10. In some embodiments, frame 20 is composed of two or more parts that are connected either outside or inside glass sleeve 10. In some embodiments, frame 20 comprises two or more parts that are incorporated into end caps 30, 31, 32, 33 and that are connected either outside or inside glass sleeve 10.

As shown in FIGS. 4A-4D, the frame 20 may comprise one or more structural elements, including a latch 22, a first longitudinal bar 24, and one or more lateral ribs 26, 27, 28, 29. The frame 20 may comprise more than one longitudinal bar. For example, a second longitudinal bar (not shown) may be located opposite the first longitudinal bar 24. The frame 20 may be made of a lightweight metal (e.g., aluminum or titanium alloys) or a hard plastic. Parts of the frame 20 may be thin and/or contain holes in order to minimize weight. For example, the first longitudinal bar 24 may be thin and/or contain holes.

In some embodiments, a battery 70 may be mounted to the latch 22. The latch 22 may fully surround, partially surround, or be adjacent to the battery 70. The latch 22 may be configured to hold the battery 70 to prevent direct contact between the battery 70 and a device or component 50. There may be an air gap between the battery 70 and a device or component 50, particularly when the device or component 50 is a display module. The thickness of the air gap may be controlled to be between 100 μm to 2 mm, or preferably 250 μm to 1.5 mm, or preferably 500 μm to 1.2 mm, or preferably 1 mm. The air gap may assist with minimizing risk of the battery 70 interfering with the device or component 50, shown in FIG. 4B. For example, the air gap may assist in preventing contact between the battery 70 and a device or component 50, particularly during flexure of the glass sleeve assembly 1 or in the event that the glass sleeve assembly 1 is dropped. The battery 70 may be coated with a shock absorbing material or component (such as a micro spring or injection molded flexible lips). The battery 70 may be mounted via an interlayer, which may be a shock absorbing interlayer.

A second device or component 52 may be mounted to the frame 20 (FIG. 4B). Optionally, the second device or component 52 may be an electronic component. There may be an air gap between the second device or component 52 and a device or component 50, particularly when the device or component 50 is a display module. Alternatively, in some embodiments, there is an additional interlayer 40 between device 50 and device 52 (not shown). The thickness of the air gap or interlayer 40 may be controlled to be between 100 μm to 2 mm, or preferably 250 μm to 1.5 mm, or preferably 500 μm to 1.2 mm, or preferably 1 mm. Such an air gap or interlayer 40 may assist with minimizing risk of the second device or component 52 interfering with the device or component 50; and may reduce the risk of damage to the device or component 50, the device or component 52, and the glass sleeve 10, particularly during flexure of the glass sleeve assembly 1 or in the event that the glass sleeve assembly 1 is dropped. The second device or component 52 may be coated with a shock absorbing material or component (such as a micro spring or injection molded flexible lips). The second device or component 52 may be mounted via an interlayer, which may be a shock absorbing interlayer.

Another aspect comprises one or more end caps. As shown in FIGS. 4A, 4B, and 4D, end caps 30, 31, 32, 33 may be incorporated into the device to provide closure of the glass sleeve 10. In some embodiments, the end caps 30, 31, 32, 33 provide protection to the glass sleeve 10 by preventing direct impact of the glass sleeve with surfaces or limiting the forces on the glass sleeve when the sleeve is dropped or impacts an object. In some embodiments, the end caps 30, 31, 32, 33 are independent and separate from the frame 20. In some embodiments, the end caps 30, 31, 32, 33 can mount or be mounted to the frame 20. In some embodiments, the end caps 30, 31, 32, 33 provide structural support for the frame 20. The end caps may be a single component at each end of the frame (i.e., there may be only end cap 30 at a first end of the frame 20 and there may be only end cap 32 at a second end of the frame 20) or may be formed from more than one end cap parts, e.g., pairs of end caps (i.e., 30 and 31 end cap parts combine to form a single end cap; 32 and 33 combine to form a single end cap). The end caps 30, 31, 32, 33 may be made of a lightweight metal (e.g., aluminum or titanium alloys) or a polymer. The end caps 30, 31, 32, 33 may be fixed to the frame 20 by any suitable means, including press fit, screws, latches, and/or adhesive. In addition, an end cap 30 at a first end of the frame 20 may be bonded to the frame 20 to form a single body of frame 20 and end cap 30.

Optionally, the end caps 30, 31, 32, 33 may directly contact the glass sleeve 10. In some embodiments, the end caps 30, 31, 32, 33 are made of a material, such as a polymer, that provides impact resistance or shock absorption to sleeve assembly 1, such that the end cap 30, 31, 32, 33 reduces the forces on the glass sleeve 10 to the extent necessary to prevent the sleeve assembly 1 from breaking when dropped or impacted on an edge or corner. Optionally, the end caps 30, 31, 32, 33 may be separated from the glass sleeve by an interlayer 42. The interlayer 42 may be mounted to the end caps 30, 31, 32, 33 and the glass sleeve 10. The interlayer 42 may be mounted to the internal surface 16 of the glass sleeve 10. The interlayer 42 may butt against the first or second rims 14, 15 of the glass sleeve 10. The interlayer 42 may provide shock absorption. In some embodiments, the interlayer 42 in combination with the end caps 30, 31, 32, 33 act to provide shock absorption. As such, the interlayer 42 may be a shock absorbing interlayer. The interlayer 42 may be made from any suitable material, including an adhesive material, a foam material, or another soft material. Examples of suitable materials include acrylates and silicone-based adhesives, such as HENKEL'S LOCTITE®. The interlayer 42 may have a thickness of 50 μm to 3 mm, or preferably 100 μm to 2 mm, or preferably 500 μm to 1.5 mm, or preferably 1 mm. The thickness of the interlayer 42 may vary in different areas. For example, the interlayer 42 may have a different thickness at the edges of the rim 14 (i.e., close to the curve in the glass sleeve 10) compared to in the central portion of the rim 14 (i.e., close to the flat portion of the glass sleeve 10). The interlayer 42 may have a Young's modulus of 0.1 to 100 MPa, 1 MPa to 75 MPa, 20 MPa to 60 MPa, or 50 MPa. In some embodiments, the interlayer has a very low Young's modulus—for example in the range is from 0.05 MPa to 3 MPa. In other embodiments, the interlayer has an intermediate to high Young's modulus—for example 50 to 75 MPa. The interlayer 42 may prevent the glass sleeve 10 from directly contacting the end caps 30, 31, 32, 33, and thus may prevent damage to the glass sleeve 10, particularly in the event that the glass sleeve assembly 1 is dropped.

Figure 5A:
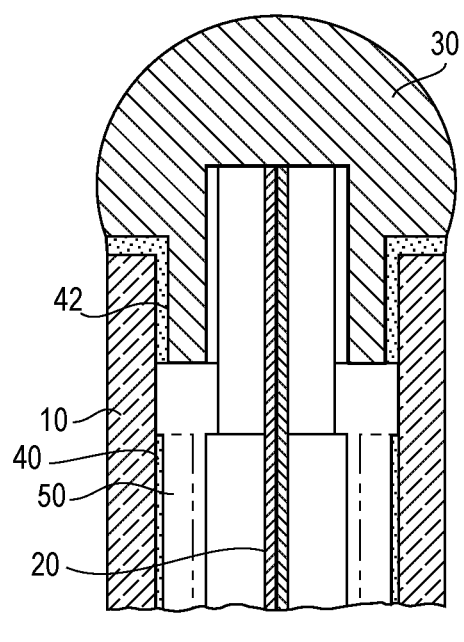
FIGS. 5A-5D show fragmentary cross-sectional views of a frame with four different embodiments of end caps mounted within a glass sleeve.
Figure 5B:
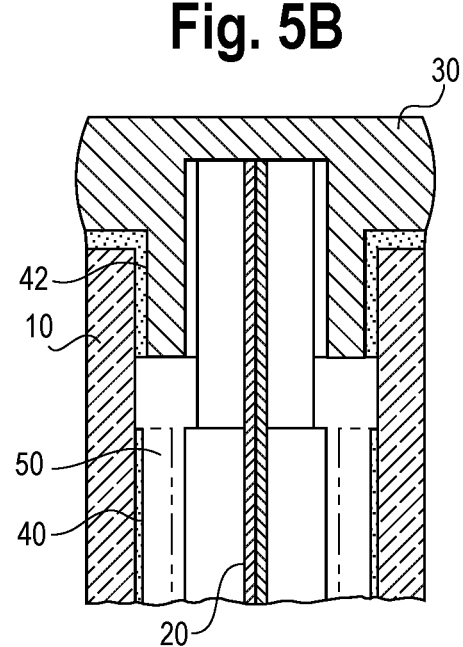
Figure 5C:
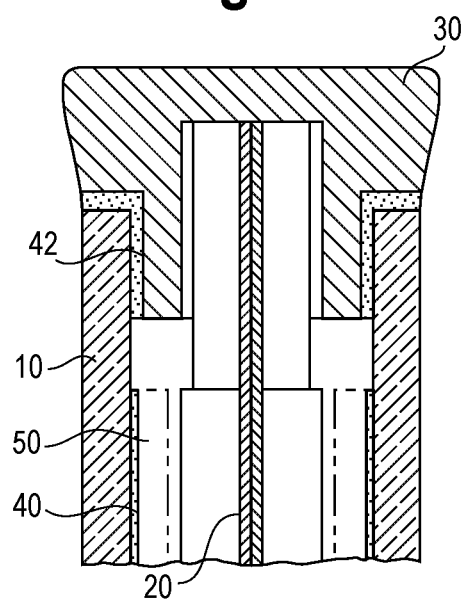
Figure 5D:
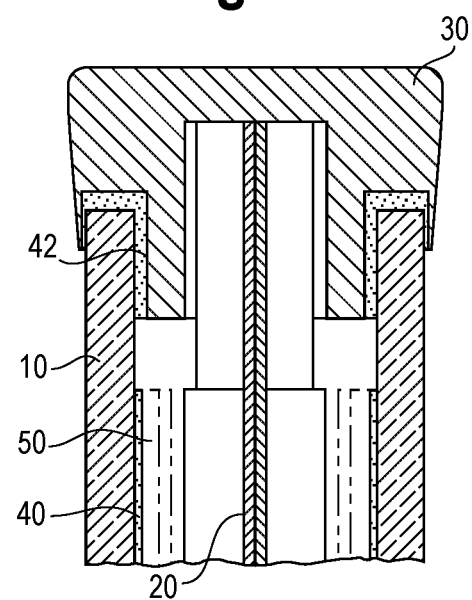

FIGS. 5A-5D illustrate different examples of embodiments of a glass sleeve assembly 1, showing differences in the shape of the end cap 30. The end cap 30 may have a protruding side. The protruding side may protect the glass sleeve 10 from damage or failure, particularly in the event that the glass sleeve assembly 1 is dropped. In some embodiments, the end cap 30 and interlayer 42 are designed to protect the glass sleeve from directly impacting a surface when dropped, for example, by protruding such that the face or edge of the sleeve never actually touches the impacted surface. In particular, the protruding side may provide protection to the flat portion of the glass sleeve 10. The protruding side may be substantially rounded, as shown in FIG. 5A. The protruding side may be substantially rounded with a truncated portion, as shown in FIG. 5B. The protruding side may extend laterally beyond an external surface 18 of the glass sleeve 10, as shown in FIG. 5C. The protruding side may extend laterally beyond an external surface 18 of the glass sleeve 10 by 200 μm to 5 mm, or preferably 500 μm to 3 mm, or preferably 750 μm to 1.5 mm, or preferably 1 mm. The end cap 30 may comprise a flange that extends to cover a portion of the external surface 18 of the glass sleeve 10, as shown in FIG. 5D. In some embodiments, the end cap 30 and interlayer 42 are designed to protect the glass sleeve from stresses due to indirect dropping the device from an elevated height on one of the ends. The end cap 30 may be made from any suitable material or combination of materials, such as a plastic, aluminum, or titanium. In some embodiments, the end cap 30 is a combination of materials of different rigidities, such that the outermost material (the material that would contact a surface) has a greater rigidity than the interior material(s). Alternatively, in some embodiments, it may be advantageous for the outer material of the end cap 30 to have a lower rigidity than the inner material(s). In some embodiments, the end cap 30 should preferably be a rigid material having a Young's modulus of from 2-110 GPa, 5-100 GPa, 2-75 GPa, 2-67 GPa, 5-75 GPa, 5-67 GPa, 20-70 GPa, 50-80 GPa, 100-120 GPa, 2-10 GPa, or 20-50 GPa. The end cap 30 may be attached to the glass sleeve 10 via an interlayer 42. The interlayer 42 may be formed of any suitable material, such as including an adhesive material, a foam material, or another soft material. Optionally, the interlayer 42 may be made from an adhesive material such as epoxy, silicone, acrylic, polyurethane, polyimide, cyanate ester, or another suitable adhesive. Optionally, the interlayer 42 may be a foam such as a polymethacrylimide-based foam, polyamide-based foam, a polyimide-based foam, a polyurethane-based foam, or another suitable polymer-based foam.

Figure 6A:
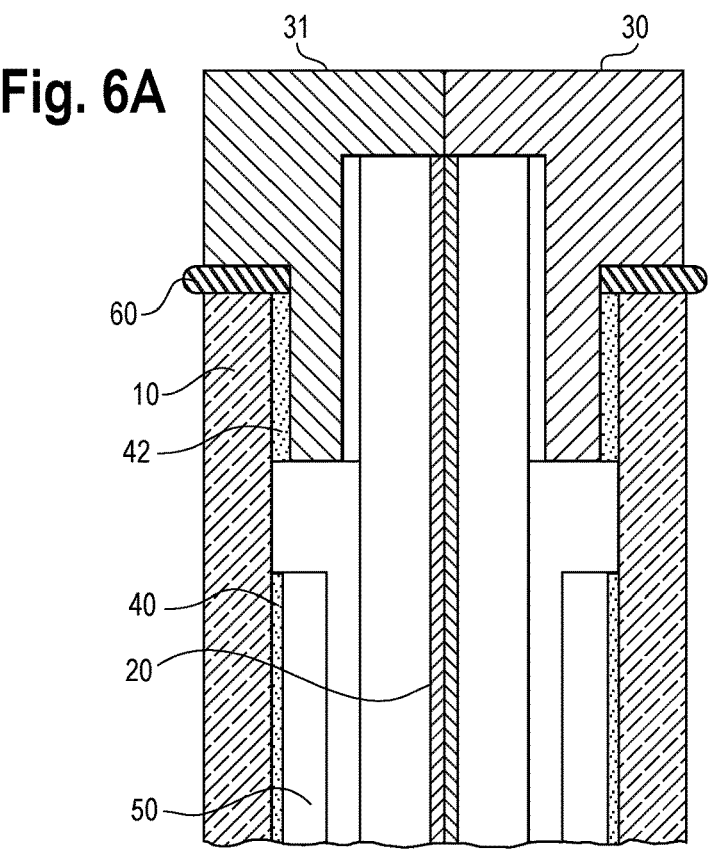
FIGS. 6A-6B show fragmentary cross-sectional views of a frame with two different embodiments of end caps mounted within a glass sleeve, where the glass sleeve is at least partially separated from the end caps by a resilient ring.
Figure 6B:
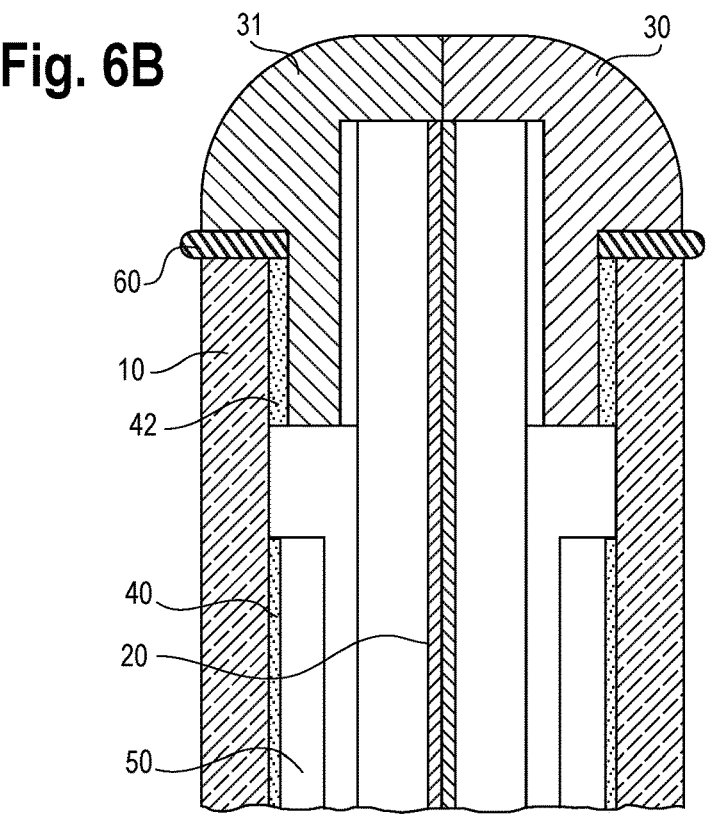

FIGS. 6A-6B illustrate different example embodiments of a glass sleeve assembly 1, showing differences in the shape of the end caps 30, 31 and the inclusion of an optional resilient ring 60. Optionally, the resilient ring 60 may be formed of a polymer or rubber. The protruding side of the end caps 30, 31 may be substantially angular, as shown in FIG. 6A. The addition of a resilient ring 60 between the end caps 30, 31 and the glass sleeve 10 may prevent damage to the glass sleeve 10, particularly in the event that the glass sleeve assembly 1 is dropped. Optionally, the resilient ring 60 may be the interlayer 42, may be part of the interlayer 42, or may be in addition to the interlayer 42. The protruding side may be substantially rounded, as shown in FIG. 6B. In some embodiments, the combination of frame 20 with the end cap 30 or end caps 30 and 31 produces a rigid frame structure to which the glass sleeve 10 is attached to via an interlayer 42 or an adhesive or other cushioning device interlayer 40 within the device. Such a design is advantageous because the glass can "float" with respect to the rigid frame 20, reducing impact stress on the glass.

Figure 7A:
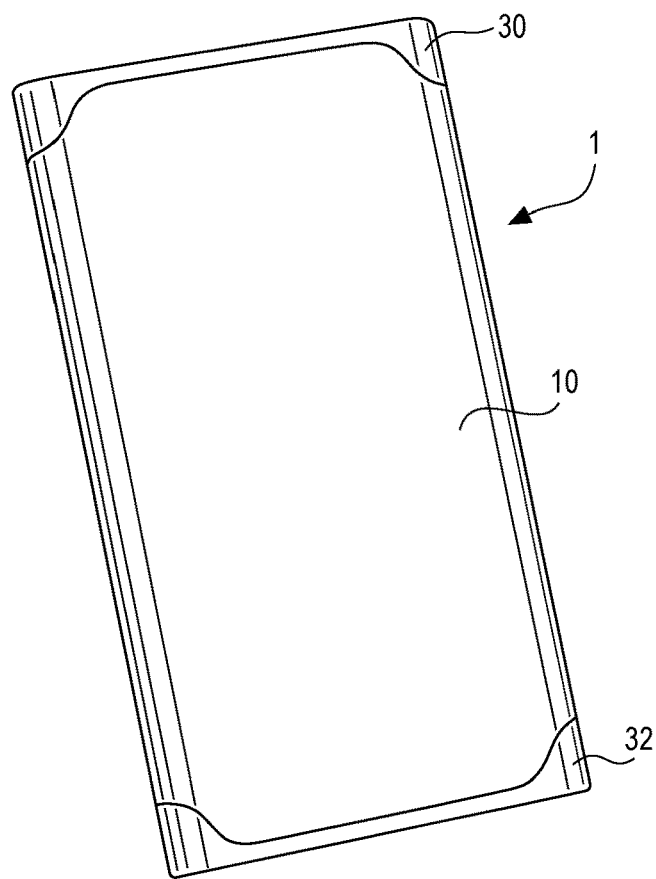
FIGS. 7A and 7B are assembly views of the end caps and sleeve.
Figure 7B:
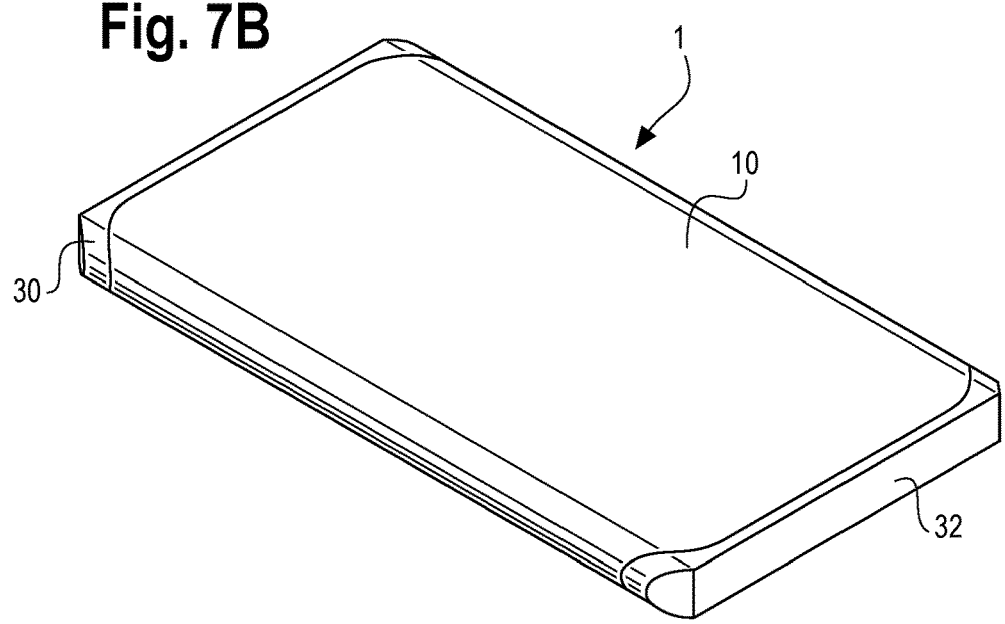

Another aspect comprises modifying the shape of the glass sleeve to reduce or remove stresses on the rims 14, 15 of the glass sleeve. FIGS. 7A-7B illustrate different examples of embodiments of a glass sleeve assembly 1, showing differences in the shape of the glass sleeve 10 and the shape of the end caps 30, 31. Optionally, the corner configurations of FIG. 7A or 7B can be combined with any of the section configurations of FIG. 5A-D or 6A-B. The corners of the glass sleeve 10 can be modified from approximately 90° (rim 14 relative to external surface 18 as shown in FIG. 1) to rounded, curved, 45°, asymmetric and the like. The glass sleeve 10 may comprise one or more chamfered or rounded corners, as shown in FIGS. 7A and 7B. Eliminating 90° corners of the glass sleeve 10 may reduce stress concentration points, which may assist with preventing failure of the glass sleeve 10, particularly in the event that the glass sleeve assembly 1 is dropped. Additionally, as shown in FIG. 7B, the corners of the end caps 30, 32 may also be chamfered or rounded. In some embodiments, the combination the shortened glass corner with the end cap that fills that section provides the best drop performance (FIG. 7A). Generally, any fillet/chamfer that moves the glass corner from the device corner is beneficial. In some embodiments, the best chamfer range can be formulated in terms of the shortened length of the glass along the long edge of the device. The best range will be from >0 to 10% of the total device length (for each end/corner).

Although the design features have been described with respect to a glass sleeve assembly 1 wherein the glass sleeve 10 is a seamless glass enclosure, the glass sleeve 10 could be constructed from smaller components. For example, the glass sleeve 10 could be made from glass components that are welded or otherwise joined to form the glass sleeve 10. Under such a construction, the glass sleeve 10 may contain one or more seams.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

The invention claimed is:

1. A glass sleeve assembly for a portable electronic device comprising:
  a glass sleeve extending longitudinally from a first opening defined by a first rim to a second opening defined by a second rim, the glass sleeve having an internal surface;
  a first end cap positioned adjacent to the first opening and having at least a portion extending longitudinally beyond the first rim;
  a second end cap positioned adjacent to the second opening and having at least a portion extending longitudinally beyond the second rim;
  a frame comprising first and second ends and a central portion between the first and second ends, the central portion located within the glass sleeve, with the first end connected to the first end cap and the second end connected to the second end cap; and
  a shock absorbing interlayer mounted to the glass sleeve and at least one of the first and second end caps,
  wherein the frame and the at least one of the first and second end caps combine to produce a rigid frame structure to which the glass sleeve is attached via the shock absorbing interlayer.

2. The glass sleeve assembly of claim 1, in which the shock absorbing interlayer is mounted to the internal surface of the glass sleeve or is butted against the first rim of the glass sleeve.

3. The glass sleeve assembly of claim 1, wherein the shock absorbing interlayer comprises a first resilient ring and optionally, a portion of the first end cap is separated from the first rim by the first resilient ring.

4. The glass sleeve assembly of claim 1, wherein the first end cap has a first protruding side extending away from the first opening.

5. The glass sleeve assembly of claim 4, wherein the glass sleeve has an external surface, and the first protruding side extends laterally beyond the external surface.

6. The glass sleeve assembly of claim 1, wherein the first protruding side is substantially rounded or comprises a chamfered corner.

7. A glass sleeve assembly for a portable electronic device comprising:
    a glass sleeve extending longitudinally from a first opening defined by a first rim to a second opening defined by a second rim, the glass sleeve having an internal surface;
    a first end cap positioned adjacent to the first opening and having at least a portion extending longitudinally beyond the first rim;
    a second end cap positioned adjacent to the second opening and having at least a portion extending longitudinally beyond the second rim;
    a shock absorbing interlayer mounted to the glass sleeve and at least one of the first and second end caps; and
    a frame comprising
        first and second ends, with the first end connected to the first end cap and the second end connected to the second end cap,
        a central portion between the first and second ends, the central portion located within the glass sleeve,
        one or more longitudinal bars,
        one or more lateral ribs, and
        a latch configured to allow a battery to be mounted to the latch,
    wherein the frame and the at least one of the first and second end caps combine to produce a rigid frame structure to which the glass sleeve is attached via the shock absorbing interlayer.

8. The glass sleeve assembly of claim 7, in which the shock absorbing interlayer is mounted to the internal surface of the glass sleeve or is butted against the first rim of the glass sleeve.

9. The glass sleeve assembly of claim 7, wherein the shock absorbing interlayer comprises a first resilient ring and optionally, a portion of the first end cap is separated from the first rim by the first resilient ring.

10. The glass sleeve assembly of claim 7, wherein a battery is mounted to the latch via a shock absorbing interlayer.

11. The glass sleeve assembly of claim 7, wherein the frame comprises two or more lateral ribs.

12. The glass sleeve assembly of claim 7, wherein the glass sleeve comprises a rounded corner or a chamfered corner.

13. A method for protecting a glass sleeve for a portable electronic device from failure, comprising the steps of:
    providing a glass sleeve extending longitudinally from a first opening defined by a first rim to a second opening defined by a second rim, the glass sleeve having an internal surface and an external surface;
    providing a frame comprising first and second ends and a central portion between the first and second ends;
    inserting the frame into the glass sleeve;
    positioning a first end cap adjacent to the first opening such that at least a portion extends longitudinally beyond the first rim, wherein the first end cap has a first protruding side extending away from the first opening, and the first protruding side extends laterally beyond the external surface of the glass sleeve;
    mounting a first shock absorbing interlayer to the first end cap and the glass sleeve;
    connecting the first end cap to the first end of the frame;
    positioning a second end cap adjacent to the second opening such that at least a portion extends longitudinally beyond the second rim; and
    connecting the second end cap to the second end of the frame,
    wherein the frame and the first end cap combine to produce a rigid frame structure to which the glass sleeve is attached via the first shock absorbing interlayer.

14. The method of claim 13, further comprising mounting the first shock absorbing interlayer to the internal surface of the glass sleeve.

15. The method of claim 13, further comprising butting the first shock absorbing interlayer against the first rim of the glass sleeve.

16. The method of claim 13, wherein the first shock absorbing interlayer comprises a first resilient ring.

17. The method of claim 16, further comprising separating a portion of the first end cap from the first rim by the first resilient ring.

18. The method of claim 13, wherein the frame is inserted into the glass sleeve prior to connecting the first end cap to the first end of the frame.

19. The method of claim 13, wherein the first end cap is connected to the first end of the frame prior to inserting the frame into the glass sleeve.

20. The method of claim 13, further comprising mounting a second shock absorbing interlayer to the second end cap and the glass sleeve prior to connecting the second end cap to the second end of the frame,
    wherein the frame, the first end cap, and the second end cap combine to produce the rigid frame structure to which the glass sleeve is attached via the first and second shock absorbing interlayers.

* * * * *